(12) United States Patent
Bao et al.

(10) Patent No.: US 9,134,957 B2
(45) Date of Patent: Sep. 15, 2015

(54) RECOMMENDING TAGS BASED ON USER RATINGS

(71) Applicant: International Business Machines Corporation, Armonk, NY (US)

(72) Inventors: Sheng Hua Bao, Beijing (CN); Xian Wu, Beijing (CN); Quan Yuan, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 13/706,727

(22) Filed: Dec. 6, 2012

(65) Prior Publication Data

US 2013/0159323 A1   Jun. 20, 2013

(30) Foreign Application Priority Data

Dec. 16, 2011   (CN) .......................... 2011 1 0422265

(51) Int. Cl.
 *G06F 17/30* (2006.01)
 *G06F 7/24* (2006.01)

(52) U.S. Cl.
 CPC ............ *G06F 7/24* (2013.01); *G06F 17/30722* (2013.01)

(58) Field of Classification Search
 CPC ............ G06F 17/2785; G06F 17/2715; G06F 17/2818; G06F 17/3043

USPC .......................................... 707/749, 752, 812
See application file for complete search history.

(56) References Cited

U.S. PATENT DOCUMENTS

| 2007/0078832 | A1  | 4/2007 | Ott, IV et al. |
| 2008/0097941 | A1* | 4/2008 | Agarwal ......................... 706/12 |
| 2009/0150786 | A1  | 6/2009 | Brown |
| 2010/0070509 | A1* | 3/2010 | Li et al. ......................... 707/747 |
| 2010/0114996 | A1* | 5/2010 | Ding et al. ..................... 707/812 |

FOREIGN PATENT DOCUMENTS

| CN | 102004774 A | 4/2011 |
| CN | 102262653 A | 11/2011 |

OTHER PUBLICATIONS

Harry Halpin et al., The Complex Dynamics of Collaborative Tagging, May 8.12, 2007, ACM, 211-220.*
Wang, J. et al. Personalization of Tagging System. Information Processing & Management (2010) 46(1): 58-70. Publisher: ACM.

* cited by examiner

Primary Examiner — Jean B Fleurantin
(74) Attorney, Agent, or Firm — Cantor Colburn LLP

(57) ABSTRACT

A method of recommending tags for user includes receiving a current rating of current user on current objects; determining a candidate tag set based on the current user and the current rating; ordering each candidate tag in the candidate tag set based on index value thereof; and recommending tags for the current user based on the ordering.

12 Claims, 9 Drawing Sheets

RECOMMENDING TAGS BASED ON USER RATINGS

PRIORITY

This application claims priority to Chinese Patent Application No. 201110422265.7, filed 16 Dec. 2011, and all the benefits accruing therefrom under 35 U.S.C. §119, the contents of which in its entirety are herein incorporated by reference.

BACKGROUND

The invention relates to a method and apparatus of recommending tags, and more particularly, to a method and apparatus of performing tag recommendation based on user's rating.

Tags allow a user to use keywords or terms to annotate various objects (such as pictures, articles, videos, etc.). For websites, a tag may expand a resource's tag set, thereby increasing an index set when retrieving resources; and, for users, the purpose of tag recommendation is to enhance user's experience during annotation, and facilitate a user's fast tag annotation.

An important feature of Web 2.0, tag recommendation is of great value for helping a user to sort and query various types of information, as well as network searching, personalized searching, sorting and clustering of network resources, etc. In some existing techniques, personalized tags may be recommended based on a user's desktop or history information, for example. In other existing techniques that use collaborative filtering, similar tags may be recommended to users in a same community based on the principle that people in a same community have similar interests.

Further, in prior art, a user is able to evaluate a certain aspect of an object or the overall object, usually in the form of rating, which is often represented by the number of stars. For example, user gives 5 points to a certain article as a whole, which represents a high degree of satisfaction. On the other hand, after a successful transaction of purchasing books at an e-commerce website, a user may only give 3 points to the quality of service provided by the seller, which represents an average rating. However, none of the existing techniques has disclosed or taught the recommendation of tags based on rating.

SUMMARY

According to a first embodiment, a method of recommending tags for user includes receiving current rating of current user on current objects; determining a candidate tag set based on the current user and the current rating; ordering candidate tags in the candidate tag set based on index values thereof; and recommending tags for the current user based on the ordering.

According to embodiment, an apparatus of recommending tags for user includes a rating means configured to receive current rating of current user on current objects; a determining means configured to determine a candidate tag set based on the current user and the current rating; an ordering means configured to order candidate tags in the candidate tag set based on index values thereof; and a recommending means configured to recommend tags for the current user based on the ordering.

BRIEF DESCRIPTION OF THE SEVERAL VIEWS OF THE DRAWINGS

Aspects of the invention will be further understood from the description of various exemplary embodiments in conjunction with accompany drawings, in which.

DETAILED DESCRIPTION

Figure 1:
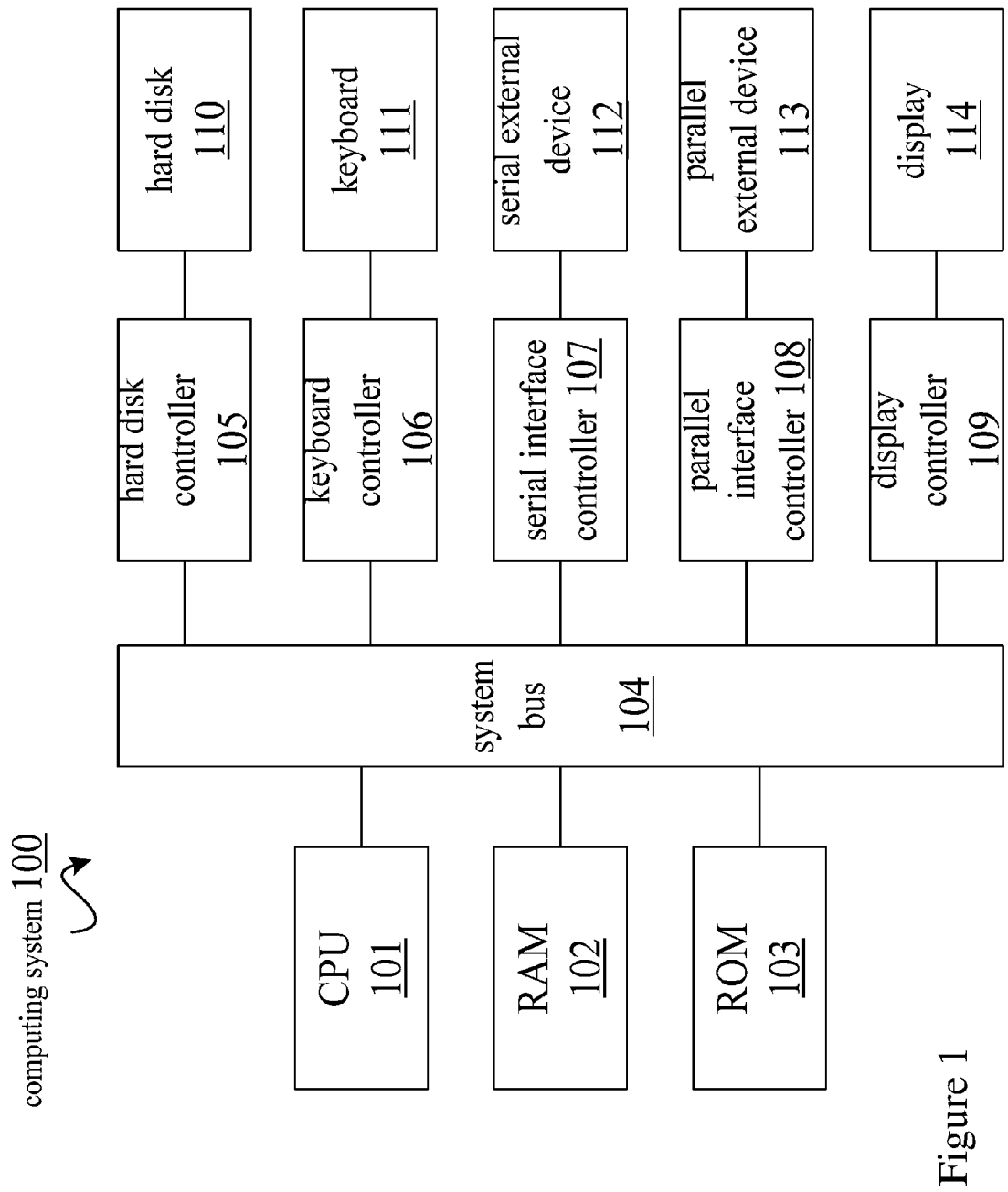
FIG. 1 shows a block diagram of an exemplary computing system adapted to implement an embodiment of the invention.

Exemplary embodiments of the invention are described below in detail. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer readable medium may be utilized. The computer readable medium may be computer-readable signal medium or computer-readable storage medium, the latter may be, but not limited to, an electronic, magnetic, optical, electromagnetic, infrared, or semiconductor system, apparatus, device, or propagation medium, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer-readable storage medium may be any tangible medium that can contain, store the program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a block diagram of an exemplary computing system 100 adapted to implement an embodiment of the invention. As shown, the computer system 100 may include: a CPU (central processing unit) 101, a RAM (random access memory) 102, a ROM (read only memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. In these devices, system bus 104 is coupled with CPU 101, RAM 102, ROM 103, hard disk controller 105, keyboard controller 106, serial interface controller 107, parallel interface controller 108, and display controller 109. Hard disk 110 is coupled with hard disk controller 105, keyboard 111 is coupled with keyboard controller 106, serial external device 112 is coupled with serial interface controller 107, parallel external device 113 is coupled with parallel interface controller 108, and display 114 is coupled with display controller 109. It should be appreciated that, the structural block diagram depicted in FIG. 1 is merely for purpose of illustration, not for limiting the scope of the invention. In some circumstances, some devices may be added or removed as needed.

Figure 2:
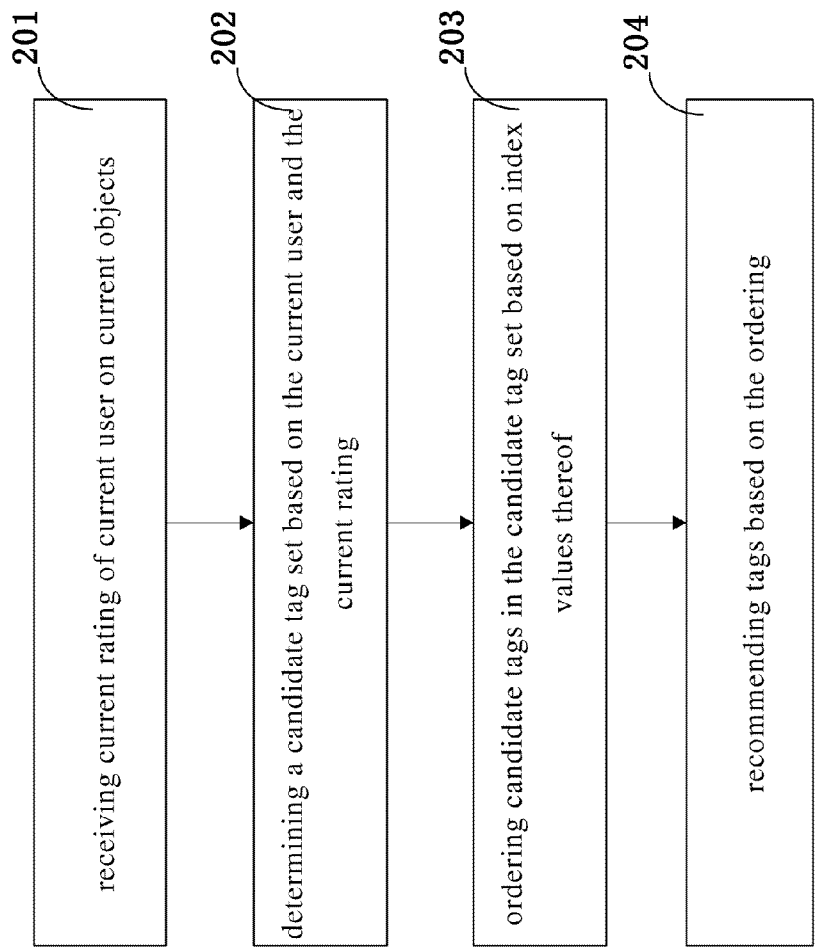
FIG. 2 shows a flow of a method for performing tag recommendation in an embodiment of the invention.

FIG. 2 shows a flow of a method for performing tag recommendation in an embodiment of the present application. In block 201, receiving current rating of current user on current objects. In this block, the rating may be an evaluation on a certain aspect such as service, product quality etc., or may be an overall evaluation.

In block 202, a candidate tag set based on the current user and the current rating is determined. In an embodiment, history tags of the current user under the current rating are determined as the candidate tag set based on predetermined correlative relationship of the user with history tags under different rating levels. Those skilled in the art may implement this block in various manners. In an embodiment, similarity between each two of the objects is taken as correlative relationship of the user with content of history tags under different ratings, the similarity between each two of the objects is determined based on content similarity of history tags of the objects and rating similarity of different users on a same object. In another embodiment, the correlative relationship of the user with history tags under different ratings is tag generative probability $p(t|u, r)$ of the user under different ratings, and the index values is generative probability of the candidate tags. The above-predetermined correlative relationship may be determined based on all users and all history tags, or be determined based on part of users and part of history tags. It will be further described below in conjunction with FIGS. 3-8.

In block 203, ordering candidate tags in the candidate tag set is based on index values thereof. In an embodiment, the index value is weight of a candidate tag; in another embodiment, the index value is generative probability of a candidate tag. In block 204, tags are recommended based on the ordering. The foremost one or more candidate tags may be recommended for user selection based on result of the ordering.

Figure 3:
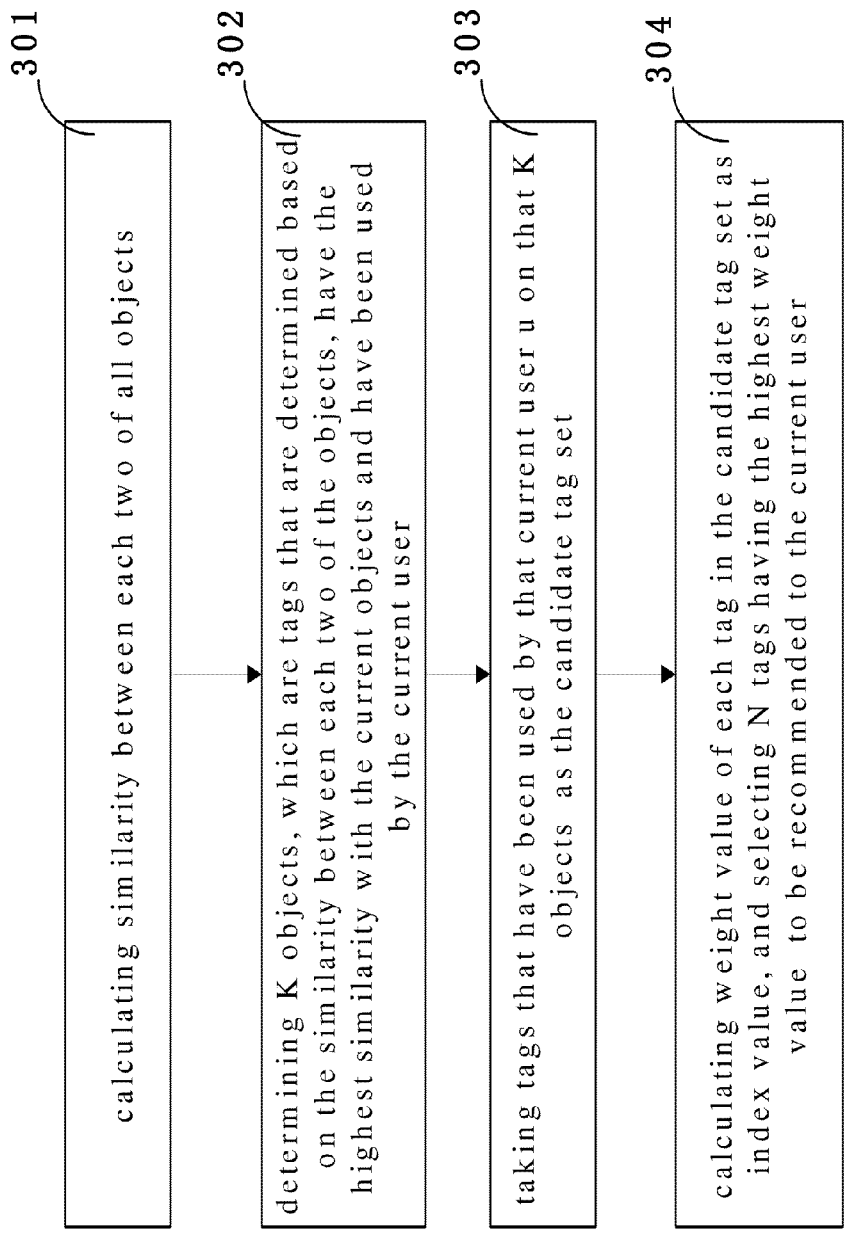
FIG. 3 shows a flowchart of recommending tags for current user u with respect to object i in a first embodiment of the invention.

FIG. 3 shows a flowchart of recommending tags for current user u with respect to object i in accordance to a first embodiment of the present application. The embodiment is an implementation based on collaborative filtering and comprises at least the following operations. In block 301, a similarity between each two of all object tags is calculated, which is determined based on content similarity of history tags of the objects and rating similarity of different users on a same object. Each of the objects has a first vector and a second vector, the first vector is term frequency/inverse document frequency (TF/IDF) value of that object on corresponding history tags, and the second vector is history rating on that object.

In this block, the content similarity $Sim1(i, j)$ needs to be determined based on similarity between the first vectors, each dimension in the first vector is term frequency/inverse document frequency (TF/IDF) value of each of the objects on corresponding history tags. TF/IDF is a weighting technique commonly used in information retrieving and text mining, and is used to evaluate importance degree of a word with respect to a document set or a document with respect to a corpus. Importance of a word increases in proportion with number of times it occurs in a document, but also decreases in inverse proportion with frequency of its occurrence in a corpus. In this embodiment, an object is viewed as a document, and a tag on the object is viewed as a word in the document. Weight of a document on each word is calculated by term frequency/inverse document frequency (TF/IDF), and then each object may be represented as a vector, each dimension in the vector represents TF/IDF value of that document on the corresponding word, further, similarity between two vectors is calculated as a first content similarity Sim1(i, j).

In an embodiment, the content similarity Sim(i, j) between two vectors is calculated by using vector space cosine similarity, in which the cosine value of an angle between two vectors in vector space is used to measure the extent of difference between two individuals. Those skilled in the art may also employ other manners such as Euclidean Distance. In contrast to distance measurement, cosine similarity pays more attention to difference of two vectors in direction and is not sensitive to absolute value. User's rating on content is more widely used to distinguish the similarity and difference of user interests. In addition, the problem of inconsistent measurement criterion that might exist among users is also corrected.

Also, the rating similarity Sim2(i, j) needs to be determined based on similarity between the second vectors. The second vector is history rating on each of the objects, that is, user's rating on each object is taken a vector, and each dimension therein corresponds to rating of one user. Then, by incorporating tag content and rating, the similarity between each two of the objects Sim(i, j)=Sim1(i, j)*a+Sim2(i, j)*(1−a) is determined, wherein, 0<a<1, parameter a is used for adjusting weight of content similarity and rating similarity. When a approaches 1, this signifies an increasing weight of content similarity, and when a approaches 0, it signifies an increasing weight of rating similarity.

In block 302, K objects are determined, the K objects are tags that are determined based on the similarity between each two of the objects, have the highest similarity with the current objects and have been used by the current user. In this block, as an alternative embodiment, rating of the current user may be further defined as r, too. In block 303, tags that have been used by that current user on that K objects are taken as the candidate tag set.

In block 304, weight value of each tag in the candidate tag set is calculated as index value, and N tags having the highest weight value are selected to be recommended to user u. In an embodiment, the weight value is $$\sum_{k=1}^{K} v_t * Sim(i, k),$$

wherein, if user u has used tag t for object k, then $v_t=1$, otherwise $v_t=0$.

Figure 4:
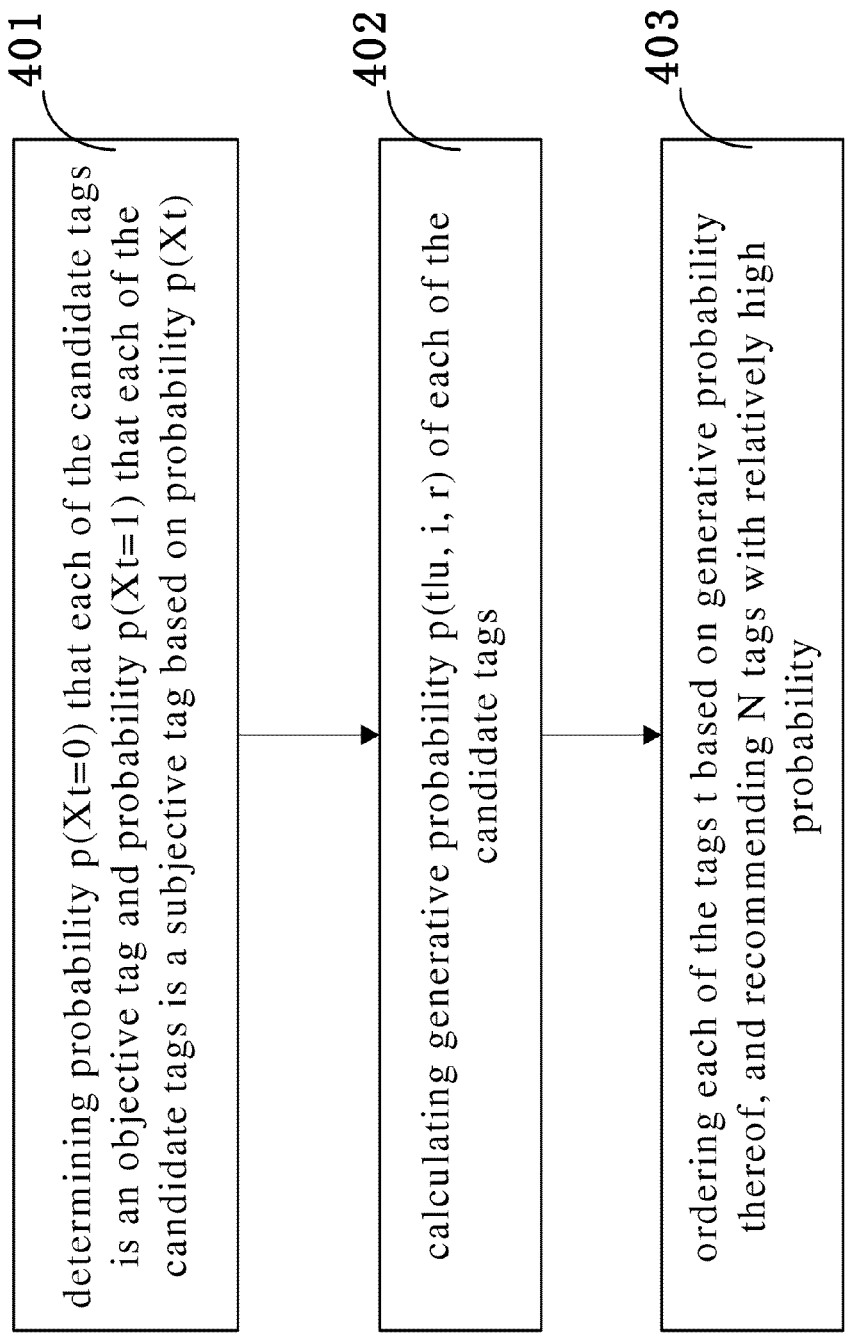
FIG. 4 shows a flowchart of implementing operations in FIG. 2 through a probability generative model in another embodiment of the invention.

FIG. 4 shows a flowchart of implementing blocks 202, 203 in FIG. 2 through a probability generative model in another embodiment of the present application, which comprises the following operations. In block 401, the probability p(Xt=0) that each of the candidate tags is an objective tag and the probability p(Xt=1) that each of the candidate tags is a subjective tag are determined based on probability p(Xt).

Here, an objective tag is descriptive of a fact and relates to things per se, while a subjective tag is user's subjective feeling, expresses information about user's opinion, attitude, etc. Taking a movie for example, director, actors and type of the movie belong to objective tags, whereas "funny," "boring," and "poor acting" belong to subjective tags. However, a tag does not absolutely belong to a certain class; instead, it is related to subjective in a certain probability and related to objective in a certain probability, which is a binary distribution. For example, a tag may be the name of a director such that if the probability parameter=0.9, it is an objective tag having a probability of 90% and a subjective tag having a probability of 10% (sometimes, a user expresses a feeling by referring to director's name), and those skilled in the art may get the distribution through existing machine learning.

Rating usually reflects user's subjective feeling, thus it can be considered that an objective tag is of little relevance to rating, while a subjective tag has close relationship with rating. In this embodiment, with the introduction of rating, the tag to be used by user can be predicted and recommended more accurately by considering the recommendation weight of a subjective tag.

In block 402, generative probability p(t|u, i, r)=p(Xt=0)*p(t|i)+p(Xt=1) p(t|u, r) of each of the candidate tags is calculated, wherein value of i is current object. Thus, given a current user and a current object and rating r that the current user assigns to the current object, generative probability p(t|u, i, r) of candidate tag t is taken as index value. In this embodiment, p(t|u, r) is used as correlative relationship of user with history tags under different ratings. Since tag distribution of the user under different rating conditions is $$p(t|u, r) = \sum_{k=1}^{K} p(t|z=k)p(z=k|u, r),$$

in which distribution p(t|u, r) of topics of history tags employed by user under different rating conditions is considered, p(t|u, r) also reflects the correlative relationship of user with history tags under different ratings. Here, K is the number of topics, and p(t|z) is probability distribution of topic on tags.

In block 403, each of the tags t is ordered based on generative probability thereof, and N tags with relatively high probability are recommended. It can be seen from the above that, in order to calculate p(t|u, i, r), the following probability distributions needs to be determined: determine tag attribute distribution p(Xt), the tag attribute comprises objective and subjective, the p(Xt) is used to determine probability p(Xt=1) that a candidate tag is a subjective tag and probability p(Xt=0) that a candidate tag is an objective tag; determine conditional probability p(t|i) of generating tag t based on an object i; determine p(t|u, r) based on equation $$p(t|u, r) = \sum_{k=1}^{K} p(t|z=k)p(z=k|u, r),$$

wherein, K is the number of topics of the history tags, p(t|z) is probability distribution of the topics on the history tags, and the p(z|u, r) is distribution of users on topics of the history tags used under different rating levels.

Those skilled in the art may obtain p(Xt), p(t|i), p(t|u, r) in an offline or online manner, next, in an embodiment, Latent Dirichlet Allocation (LDA) model will be taken as an example for description.

Figure 5:
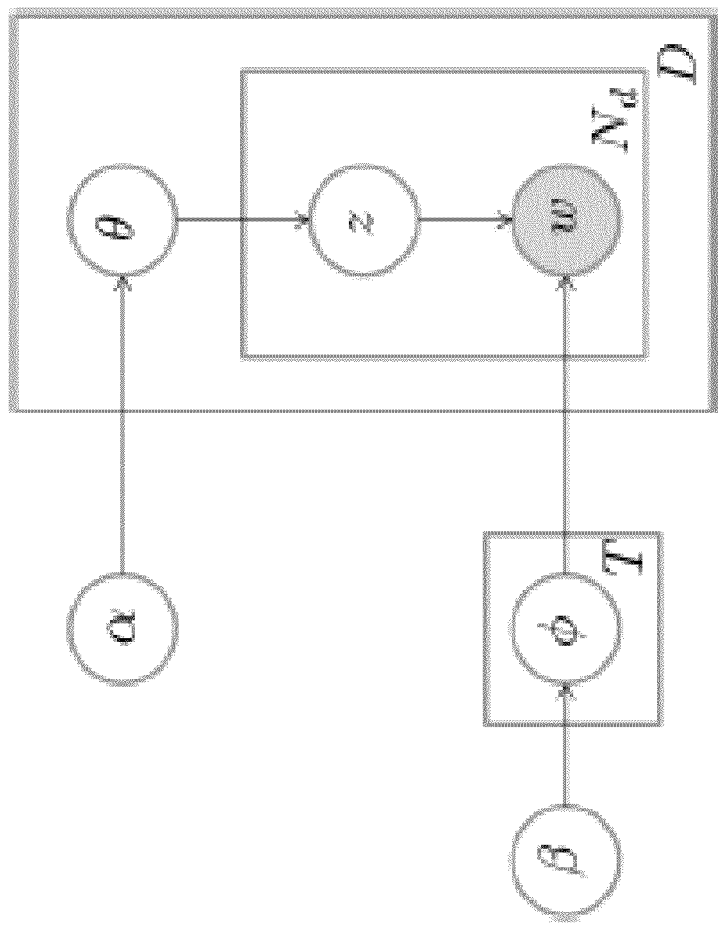
FIG. 5 shows a diagram of a LDA graph model in prior art.

FIG. 5 shows an LDA graph model in prior art. LDA is a probability generative model commonly used in the art, which belongs to unsupervised machine learning technique. Usually, it is used to identify topic information hidden in a large document set, rather than performing prediction directly based on the observed document, LDA first assumes a process of generating documents, then predicts what is the generation process behind based on the observed documents. LDA assumes that there are K topics in any document; and in turn each topic is distribution of words. For each document, the generation process defined by LDA is as follows: sampling a topic from topic distribution; sampling a word from word distribution corresponding to the sampled topic; repeating the above process until each word in the document is traversed.

In FIG. 5, each document corresponds to a multinomial distribution over T (which is given in advance by trial and error etc.) topics, and that multinomial distribution is denoted as θ. Each topic in turn corresponds to a multinomial distribution over V words in a vocabulary, and that multinomial distribution is denoted as φ. A vocabulary comprises all distinctive words in all documents of a corpus. θ and φ each have a Dirichlet priori distribution with hyperparameters α and β. For each word in a document d, a topic z is sampled from the multinomial distribution θ corresponding to that document, then a word w is sampled from the multinomial distribution φ corresponding to the topic z. Repeating this process for $N_d$ times generates document d, $N_d$ is the total number of words in document d. This generation process may be represented with the following graph model.

The shaded circle in FIG. 5 represents observed variable, the un-shaded circle represents latent variable, the arrow represents conditional dependency between two variables, block represents repeat sampling and repeat times is shown at lower right corner of the block. There are two parameters to be inferred in this model: one is "document-topic" distribution θ, the other is T "topic-terms" distribution φ. The inferring method mainly comprises variation EM algorithm proposed by David M. Blei, et. al., authors of LDA model, and now the commonly used Gibbs sampling method.

Specifically, in this embodiment, the process of inputting tags by a user is simulated with a LDA model, the user is regarded as a document, and the tag that has been used by the user is regarded as a word in the document. In the same way, an object is also regarded as a document, and a tag added on the object is regarded as a word in the document. Based on LDA algorithm, topic distribution of users under different ratings p(z|u, r), topic distribution of objects p(z|i), and probability distribution of each topic z on a tag p(t|z) may be calculated. In this embodiment, the rating response by the user is introduced for LDA. Since a topic cared by each user is a probability distribution, there are different topic distributions when user gives different ratings. In this improved embodiment, user's rating information may be added into the original LAD to achieve finer modeling, thereby improving accuracy in prediction.

Figure 6:
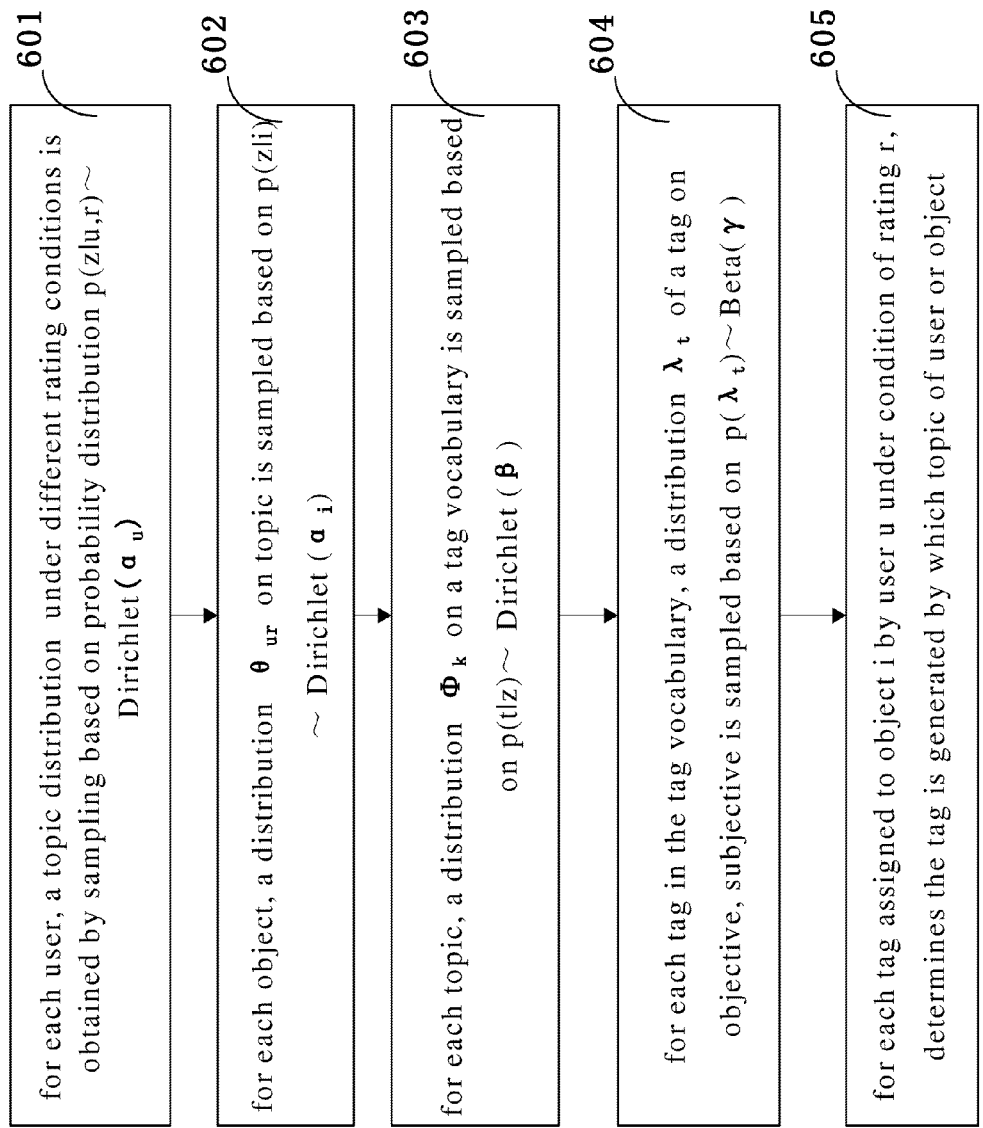
FIG. 6 shows a diagram of user tag's probability generative model in an embodiment of the invention.
Figure 7:
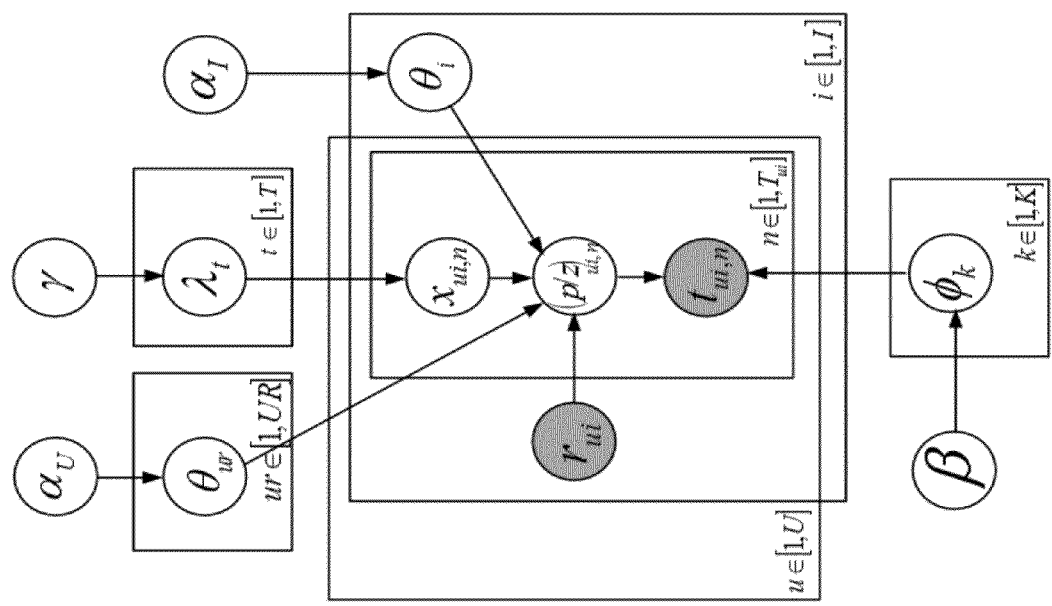
FIG. 7 shows a diagram of a LDA graph model in an embodiment of the invention.

FIG. 6 shows a diagram of user tag's probability generative model in an embodiment of the present application. FIG. 7 shows a graph model according to an embodiment of the present application, in which the following parameters are concerned:

$\alpha_U$, $\alpha_1$, β, γ: hyperparameters, priori distribution parameters;
$\theta_{ur}$: topic distribution p(z|u, r) of user u under condition of rating r;
$\theta_i$: topic distribution p(z|i) of object i;
$\lambda_t$: distribution p(X) of tag t on <objective, subjective>;
$\phi_k$: distribution p(t|z) of topic k on tag vocabulary;
$r_{ui}$: rating that user u assigned to object i;
x=0: objective tag, created by topics on an object;
x=1: subjective tag, created by topics of user;
p/z: topic example, for the purpose of discrimination: p represents user topic, z represents object topic;
t: tag example;

$T_{ui}$: number of tags that user u assigned to object i;
U, I, T: number of users, number of objects, number of tags (size of vocabulary);
R: number of rating levels (if ratings are 1, 2, 3, 4, 5, then number of rating levels is 5);
K: number of topics.

Referring to the flow shown in FIG. 6 and graph model of FIG. 7, rating based user tag's probability generative model has following operations:

In block 601, for each user u, a topic distribution $\theta_{ur}$ under different rating conditions r is obtained by sampling based on probability distribution p(z|u,r)~Dirichlet ($\alpha_U$). In block 602, for each object i, a distribution $\theta_i$ on topic is sampled based on probability distribution p(z|i)~Dirichlet ($\alpha_I$). In block 603, for each topic z, a distribution $\phi_k$ on a tag vocabulary is sampled based on probability distribution p(t|z)~Dirichlet (β). In block 604, for each tag t in the tag vocabulary, a distribution coefficient $\lambda_t$ of a tag on objective, subjective is sampled based on probability distribution p($\lambda_t$)~Beta(γ). In block 605, for each tag t assigned to object i by user u under condition of rating r, it is determined tag t is generated by which topic of user or object.

In this block, it is obtained by sampling whether this tag is an objective tag (X=0) or a subjective tag (X=1) based on probability distribution p(X)~Binomial($\lambda_t$). If it is an objective tag (X=0), then, based on topic distribution zt~p(z|i) of the object, a topic is obtained by sampling; based on distribution p(t|zt) of the topic on tag vocabulary, a tag is obtained by sampling from topic zt. If it is a subjective tag (X=1), then, based on topic distribution zt~p(z|u, r) of user under condition of rating r, a topic is obtained by sampling; based on distribution p(t|zt) of topic on tag vocabulary, a tag is obtained by sampling from topic zt.

For hyperparameters $\alpha_U$, $\alpha_I$, β, γ therein, those skilled in the art may make selection and adjustment according to their experiences, for example, they may be set as: $\alpha_U=\alpha_I=50/K$, β=0.01, γ=0.5. Those skilled in the art may perform parameter estimation through Gibbs sampling according to the above probability generative model. A generative model describes a process of generating observed data according to assumed model and parameters; while Gibbs sampling is reverse derivation for some probability distribution obtained from a generative model.

Figure 8:
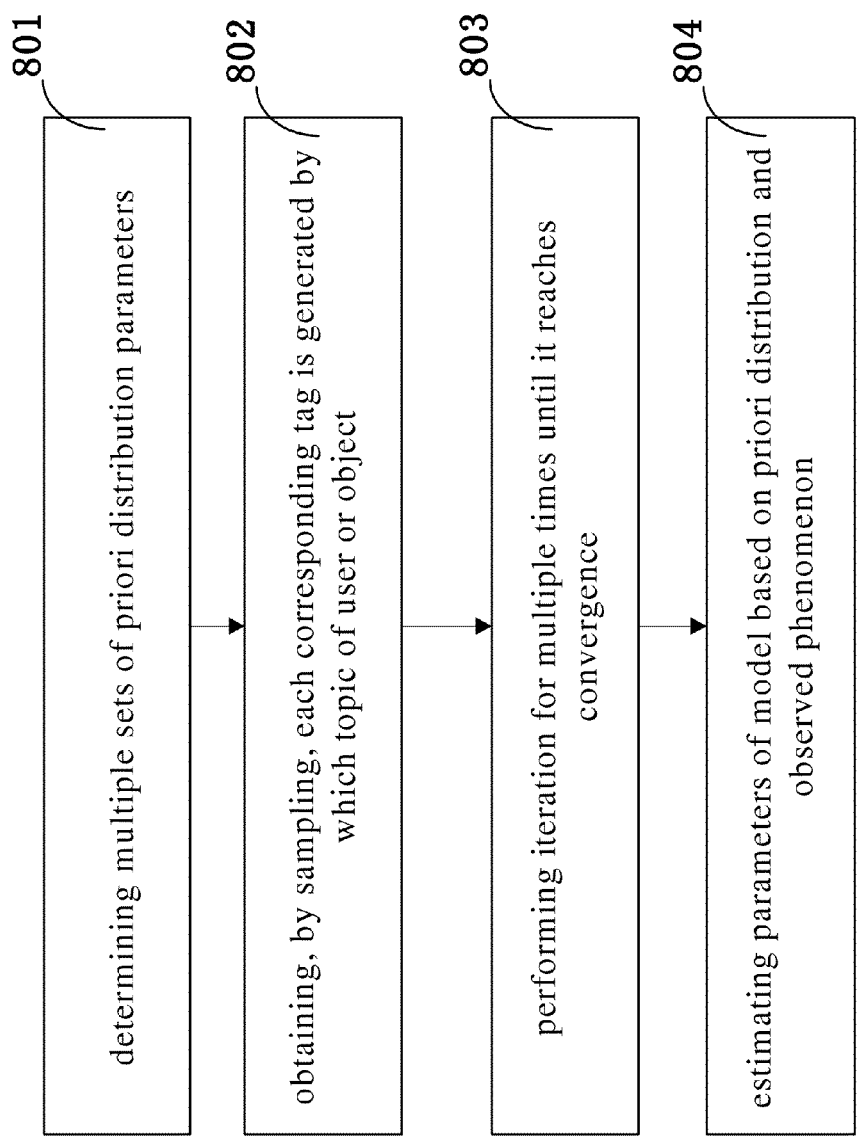
FIG. 8 shows a flow of inferring parameters through Gibbs sampling in an embodiment of the invention.

FIG. 8 shows a flow of inferring parameters through Gibbs sampling in an embodiment of the invention, which comprises the following operations. In block 801, multiple sets of priori distribution parameters are determined. Assuming the number of topics is K and size of tag vocabulary is V, $\vec{\alpha}_u = <\alpha_u, \ldots, \alpha_u>$, $\vec{\alpha}_i = <\alpha_i, \ldots \alpha_i>$ each K-dimension vector. In block 802, each corresponding tag is generated by which topic of user or object is obtained by sampling. With this block, values of X and Z may be learned for each tag, (X=0, Z=j) represents j-th topic of the object, (X=1, Z=m) represents m-th topic of the user. In block 803, iteration is performed for multiple times until it reaches convergence. In an embodiment, it is directly iterated for sufficient times, for example, 1000 times, which may be determined by those skilled in the art from experience.

In block 804, parameters of model are estimated based on priori distribution and observed phenomenon. With distribution P(X, Z) obtained after convergence at block 702, four types of parameter distribution may be derived as follows:

$\theta_{ur}$: p(z|u,r)~Dirichlet($\vec{\alpha}_u + \vec{n}_u$), wherein, $\vec{n}_u$ is a K-dimension vector, value of each dimension k is equal to number of times generated by topic k in subjective tag of user u under condition of rating r.

$\theta_i$: $p(z|i)$~Dirichlet ($\vec{\alpha}_i + \vec{n}_i$), wherein, is a K-dimension vector, value of each dimension k is equal to number of times generated by topic k in all tags of object i.

$\phi_k$: $p(t|z)$~Dirichlet ($\vec{\beta} + \vec{n}_z$), wherein, $\vec{n}_z$ is a V-dimension vector, value of each dimension v is equal to number of times that tag t is generated by topic z in all tags.

$\lambda_t$: $p(\lambda_t)$~Beta($\vec{\gamma} + \vec{n}_t$), wherein, $\vec{n}_t$ is a 2-dimension vector, and is number of times tag t is an objective tag and a subjective tag, respectively.

Further, distribution of t generated by object i $$p(t|i) = \sum_{k=1}^{K} p(t|z=k)p(z=k|i)$$

is obtained. Here, P(t|i) is conditional probability that tag t is generated by given object i; P(z=k|i) is probability that topic z=k is selected by given object i; P(t|z=k) is probability that tag t is generated by given topic z=k.

After introducing rating information, topic distributions p(z|u, r) of user under different ratings are different. Thus, $$p(t|u, r) = \sum_{k=1}^{K} p(t|z=k)p(z=k|u, r),$$

wherein, P(t|u,r) is conditional probability that tag t is generated by given user u when rating is r; P(z=k|u, r) is probability that topic z=k is selected by given user u when rating is r; P(t|z=k) is probability that tag t is generated by given topic z=k.

Figure 9:
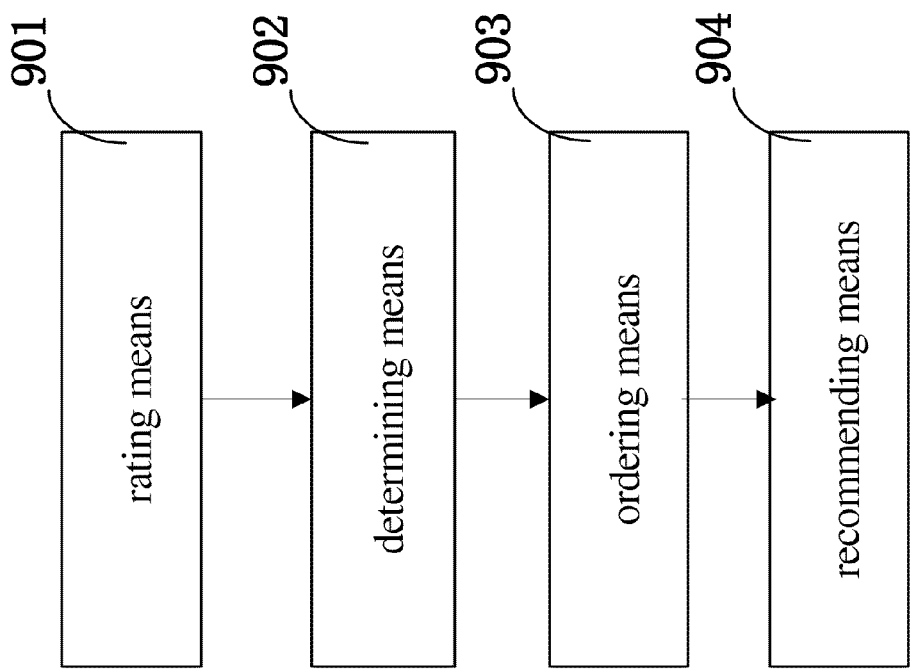
FIG. 9 shows a diagram of an apparatus of recommending tags for user according to an embodiment of the invention.

FIG. 9 shows an apparatus of recommending tags for user according to the present application, the apparatus comprising: a rating means 901 configured to receive current rating of current user on current objects; a determining means 902 configured to determine a candidate tag set based on the current user and the current rating; an ordering means 903 configured to order candidate tags in the candidate tag set based on index values thereof; a recommending means 904 configured to recommend tags for the current user based on the ordering.

In an embodiment, the determining means 902 comprises: means configured to determine history tags of the current user under the current rating as the candidate tag set based on predetermined correlative relationship of the user with history tags under different rating levels.

In an embodiment, the correlative relationship of the user with content of history tags under different rating levels comprises similarity between each two of the objects, which takes in consideration content similarity of history tags of the objects and rating similarity of different users on a same object.

In an improved embodiment, each object has a first vector and a second vector, the first vector is TF/IDF value of each object on corresponding history tags, and the second vector is history rating on each object, wherein, the determining means comprises: means configured to determine the content similarity Sim1(i, j) based on similarity between the first vectors; means configured to determine the rating similarity Sim2(i, j) based on similarity between the second vectors; means configured to determine the similarity between each two of the objects Sim(i, j)=Sim1(i, j)*a+Sim2(i, j)*(1−a), wherein 0<a<1, parameter a is used for adjusting weight.

Wherein, the determining means 902 further comprises: means configured to determine K objects, which are tags that are determined based on the similarity between each two of the objects, have the highest similarity with the current objects and have been used by the current user; means configured to take tags used by that current user on that K objects as the candidate tag set. In an improved embodiment, the K objects further define rating of the current user as r, too. Wherein, the index values comprise weighted value $$\sum_{k=1}^{K} v_t * Sim(i, k),$$

wherein, if the current user uses tag t for k-th object, then $v_t=1$, otherwise $v_t=0$.

In another embodiment, the correlative relationship of the user with history tags under different rating levels comprises tag generative probability p(t|u, r) of the user under different rating levels, and the index values comprise generative probability of the candidate tags.

In an improved embodiment, it further comprises: means configured to determine tag attribute distribution p(Xt), the tag attribute comprises objective and subjective; means configured to determine conditional probability p(t|i) of generating the candidate tag t based on the object i; means configured to determine the $$p(t|u, r) = \sum_{k=1}^{K} p(t|z=k)p(z=k|u, r),$$

wherein, K is the number of topics of the history tags, p(t|z) is distribution of the topics on the history tags, and the p(z|u, r) is distribution of users on topics under different rating levels.

In an improved embodiment, it further comprises: means configured to determine probability p(Xt=0) that each of the candidate tags is an objective tag and probability p(Xt=1) that each of the candidate tags is a subjective tag based on the probability p(Xt); means configured to compute generative probability of each of the candidate tags p(z|u, i, r)= p(Xt=0)*p(t|i)+p(Xt=1)*p(t|u, r).

For detailed execution manners of the above units, apparatus and devices, reference may be made to the detailed description given in conjunction with the above method flow and specific examples, which will be omitted here for brevity.

The above described method and apparatus of tag recommendation may be realized by a computer system. The flowchart and block diagrams in the Figures illustrate the architecture, functionality, and operation of possible implementations of methods, apparatus and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the method, apparatus and various means of the present invention are described with reference to detailed embodiments, the present invention is not limited thereto. Those skilled in the art can make various changes, replacements and modifications to the invention under teaching of description without departing from the scope and spirit of the invention. It should be appreciated that, all such changes, replacements and modifications still fall into protection scope of the invention, which is defined by the appended claims.

The invention claimed is:

1. A method of recommending tags for user, the method comprising:
receiving, with a processing device, a current rating of a current user on current objects;
determining a candidate tag set based on the current user and the current rating by determining history tags of the current user under the current rating as the candidate tag set based on a predetermined correlative relationship of the user with history tags under different rating levels, wherein the correlative relationship of the user with content of history tags under different rating levels comprises similarity between each two of the objects, which is determined based on content similarity of history tags of the objects and rating similarity of different users on a same object;
wherein each object has a first vector and a second vector, the first vector is term frequency/inverse document frequency value of that object on corresponding history tags, and the second vector is history rating on that object, and determination of the similarity between each two of the objects comprises:
determining the content similarity Sim1(i, j) based on similarity between the first vectors;
determining the rating similarity Sim2(i, j) based on similarity between the second vectors; and
determining the similarity between each two of the objects Sim(i, j)=Sim1(i, j)*a+Sim2(i, j)*(1−a), wherein 0<a<1, parameter a is used for adjusting weight;
ordering candidate tags in the candidate tag set based on index values thereof; and
recommending tags for the current user based on the ordering of the candidate tags in the candidate tag set.

2. The method according to claim 1, wherein, the determining history tags of the current user under the current rating as the candidate tag set based on predetermined correlative relationship of the user with history tags under different rating levels comprises:
determining K objects, which are tags that are determined based on the similarity between each two of the objects, have the highest similarity with the current objects and have been used by the current user; and
taking tags used by that current user on that K objects as the candidate tag set.

3. The method according to claim 2, wherein determining K objects comprises further defining a rating of the current user as r.

4. The method according to claim 2, wherein, the index values comprise a weighted value $$\sum_{k=1}^{K} v_t * Sim(i, k)$$

of the candidate tags, wherein, if the current user uses tag t for k-th object, then $v_t=1$, otherwise $v_t=0$.

5. A method of recommending tags for user, the method comprising:
receiving, with a processing device, a current rating of a current user on current objects;
determining a candidate tag set based on the current user and the current rating by determining history tags of the current user under the current rating as the candidate tag set based on predetermined correlative relationship of the user with history tags under different rating levels, wherein the correlative relationship of the user with history tags under different rating levels comprises a tag generative probability p(t|u, r) of the user under different rating levels, and the index values comprise a generative probability of the candidate tags;
ordering candidate tags in the candidate tag set based on index values thereof; and
recommending tags for the current user based on the ordering of the candidate tags in the candidate tag set;
determining tag attribute distribution p(Xt), the tag attribute comprises objective and subjective;
determining distribution of object i on tag t p(t|i); and
determining the $$p(t|u, r) = \sum_{k=1}^{K} p(t|z=k)p(z=k|u, r),$$

wherein K is the number of topics z of the history tags, p(t|z) is distribution of the topics z on the history tags, and the p(z|u, r) is distribution of users on topics z of the history tags under different rating levels.

6. The method according to claim 5, wherein:
determining probability p(Xt=0) that each of the candidate tags is an objective tag and probability p(Xt=1) that each of the candidate tags is a subjective tag based on the tag attribute distribution p(Xt); and
computing generative probability of the candidate tags based on the equation p(Xt=0)*p(t|i)+p(Xt=1)*p(t|u, r).

7. An apparatus for recommending tags for user, the apparatus comprising:
a processor implemented rating means configured to receive a current rating of a current user on current objects;
a processor implemented determining means configured to determine a candidate tag set based on the current user and the current rating, the determining means comprising means configured to determine history tags of the current user under the current rating as the candidate tag set based on a predetermined correlative relationship of the user with history tags under different rating levels, the correlative relationship of the user with content of history tags under different rating levels comprising similarity between each two of the objects, which is determined based on content similarity of history tags of the objects and rating similarity of different users on a same object;

wherein each object has a first vector and a second vector, the first vector is a term frequency/inverse document frequency value of that object on corresponding history tags, and the second vector is a history rating on that object;

a processor implemented means configured to determine the content similarity Sim1(i, j) based on similarity between the first vectors;

a processor implemented means configured to determine the rating similarity Sim2(i, j) based on similarity between the second vectors;

a processor implemented means configured to determine the similarity between each two of the objects Sim(i, j)=Sim1(i, j)*a+Sim2(i, j)*(1−a), wherein 0<a<1, parameter a is used for adjusting weight;

a processor implemented ordering means configured to order candidate tags in the candidate tag set based on index values thereof; and a processor implemented recommending means configured to recommend tags for the current user based on the ordering of the candidate tags in the candidate tag set.

8. The apparatus according to claim 7, wherein, the determining means further comprises:

a processor implemented means configured to determine K objects, which are tags that are determined based on the similarity between each two of the objects, have the highest similarity with the current objects and have been used by the current user; and a processor implemented means configured to take tags used by that current user on that K objects as the candidate tag set.

9. The apparatus according to claim 8, wherein the K objects further define rating of the current user as r.

10. The apparatus according to claim 8, wherein the index values comprise weighted value $$\sum_{k=1}^{K} v_t * Sim(i, k),$$

wherein, if the current user uses tag t for k-th object, then $v_t=1$, otherwise $v_t=0$.

11. An apparatus for recommending tags for user, the apparatus comprising:

a processor implemented rating means configured to receive a current rating of a current user on current objects;

a processor implemented determining means configured to determine a candidate tag set based on the current user and the current rating, wherein the determining means comprises means configured to determine history tags of the current user under the current rating as the candidate tag set based on a predetermined correlative relationship of the user with history tags under different rating levels, the correlative relationship of the user with history tags under different rating levels comprising a tag generative probability p(t|u, r) of the user under different rating levels, and the index values comprising generative probability of the candidate tags;

a processor implemented recommending means configured to recommend tags for the current user based on the ordering of the candidate tags in the candidate tag set;

a processor implemented means configured to determine tag attribute distribution p(Xt), the tag attribute being objective and subjective;

a processor implemented means configured to determine a conditional probability p(t|i) of generating the candidate tag t based on the object i; and a processor implemented means configured to determine $$p(t\mid u, r) = \sum_{k=1}^{K} p(t\mid z = k) p(z = k \mid u, r),$$

wherein, K is the number of topics z of the history tags, p(t|z) is distribution of the topics on the history tags, and wherein p(z|u, r) is a distribution of users on topics under different rating levels.

12. The apparatus according to claim 11, further comprising:

a processor implemented means configured to determine probability p(Xt=0) that each of the candidate tags is an objective tag and probability p(Xt=1) that each of the candidate tags is a subjective tag based on the tag attribute distribution p(Xt); and a processor implemented means configured to compute generative probability of the candidate tags based on the equation p(Xt=0)*p(t|i)+p(Xt=1)*p(t|u, r).

* * * * *